(No Model.)

J. L. FINCH.
WRENCH.

No. 378,299. Patented Feb. 21, 1888.

Witnesses
P. Walter Fowler
W. H. Patterson

Inventor
John L. Finch
by A. H. Evans & Co.
Attorneys

UNITED STATES PATENT OFFICE.

JOHN L. FINCH, OF WARWICK, NEW YORK.

WRENCH.

SPECIFICATION forming part of Letters Patent No. 378,299, dated February 21, 1888.

Application filed September 21, 1887. Serial No. 250,289. (No model.)

*To all whom it may concern:*

Be it known that I, JOHN L. FINCH, a citizen of the United States, residing at Warwick, in the county of Orange and State of New York, have invented certain new and useful Improvements in Wrenches, of which the following is a full, clear, and exact description, reference being had to the accompanying drawings, forming part of this specification, in which—

Figure 1:
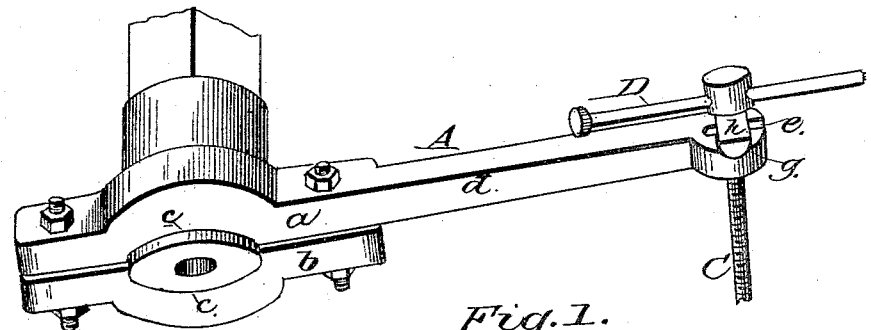
Figure 2:
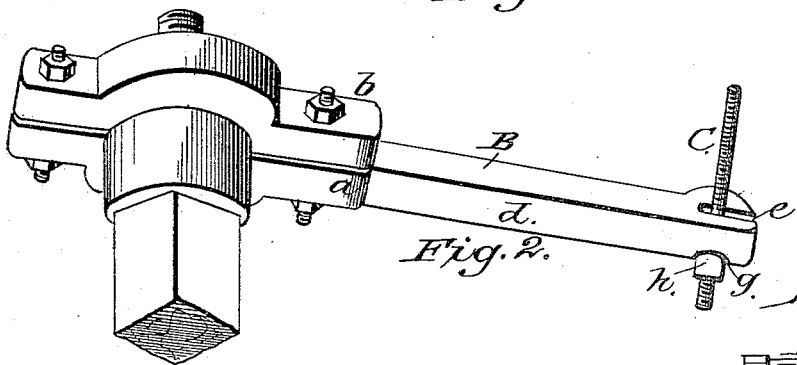
Figures 3, 4:
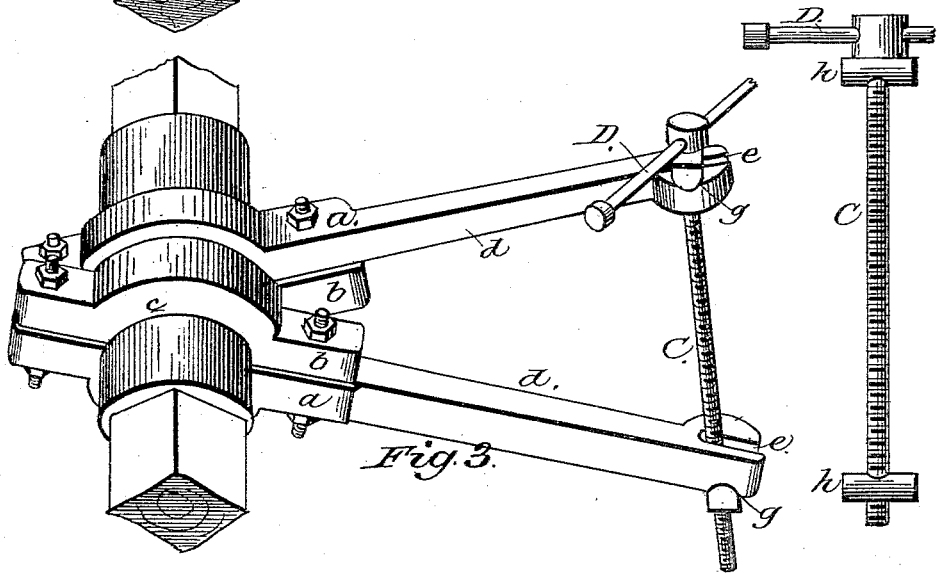

Figures 1 and 2 represent perspective views of the wrench-sections detached. Fig. 3 is a similar view showing the sections in operative position. Fig. 4 is a detail of a device for drawing the extremities of the sections together.

My invention relates to devices applied to the meeting ends of screwed sections for connecting or disconnecting said sections; and my invention consists, essentially, of a clamp or section applied to the meeting ends of the part to be joined or separated and having their extremities united by a power device for moving the clamps or sections in opposite directions, whereby the jointed sections of the pipe or other object may be separated or tightly screwed together, as I shall hereinafter fully describe.

To enable others skilled in the art to make and use my invention, I will now describe its construction and indicate the manner in which the same is carried out.

It is well known to those skilled in the art that some of the implements used in the sinking of Artesian wells consist of several pieces screwed together with so much force as to require the employment of large wrenches, crowbars, and like devices, and also requires the combined strength of several men to unscrew said pieces.

The present invention is designed to furnish a simple and powerful wrench which may be operated by one man and yet unscrew a sectional pipe-shank or other object without difficulty.

Referring to the drawings, A and B represent the two sections of my wrench, one of which is applied to the meeting end of the pipe, shank, or other jointed object to be unscrewed. These sections each consist of two clamping-plates, $a$ and $b$, having curved faces at $c$ for engaging by frictional contact the object to be unscrewed. The clamping-plates $a$ and $b$ encircle the sectional pipe or other object at or near the point of juncture and are firmly united to each other and to the pipe or shank by nuts and bolts. One of the members of each clamp is extended at one side to form a lever, $d$, the outer ends of which are provided with inwardly-turned slotted heads $e$, having curved seats $g$ for the curved faces of elongated threaded nuts $h$ upon the screw C. This screw C is passed into the slotted heads $e$, with the curved faces of the nuts $h$ resting in the seats $g$, and is provided with a head through which a rod or operating-lever, D, is passed to facilitate the operation of the wrench-sections.

From this description it will be seen that when the wrench-sections are properly applied to the object to be unscrewed and the rod or lever D operated a powerful leverage is brought to bear upon the extensions or levers $d$, causing each section to move in opposite directions, thereby unscrewing the sectional pipe or object to which the wrench is applied. The curved inner faces of the clamping-plates may be smooth or rough, as desired, although I prefer to make them smooth, so as not to injure the polished surface of a finished pipe or tubular section.

To remove the wrench, loosen the fastening-nuts which hold the clamping-plates together and slip the latter off the ends of the disjointed sections.

Having thus described my invention, what I claim as new, and desire to secure by Letters Patent, is—

1. A wrench consisting of a plural number of independent two-part clamping-sections adapted to be applied to the meeting ends of the pipe or other object to be coupled or uncoupled, and a power device, substantially as described, connecting the outer ends of the sections and moving the section of the pipe in opposite directions.

2. Two clamping-sections, one of which is adapted to be secured to each meeting end of the pipe or object to be coupled or uncoupled, said sections having curved faces for engaging said pipe or object by frictional contact, in combination with an operating-screw engaging said sections and moving them in opposite directions, substantially as described.

JOHN L. FINCH.

Witnesses:
ALVAH W. EDSALL,
EDWIN S. COLWELL.